(12) United States Patent
Kisaka

(10) Patent No.: US 7,136,258 B2
(45) Date of Patent: Nov. 14, 2006

(54) ROTATIONAL RECORDING APPARATUS AND CONTROL METHOD

(75) Inventor: Masashi Kisaka, Yokohama (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 584 days.

(21) Appl. No.: 10/242,220

(22) Filed: Sep. 12, 2002

(65) Prior Publication Data

US 2003/0072102 A1 Apr. 17, 2003

(30) Foreign Application Priority Data

Sep. 21, 2001 (JP) ............................. 2001-290030

(51) Int. Cl.
*G11B 5/596* (2006.01)

(52) U.S. Cl. .................................................. 360/78.07

(58) Field of Classification Search .............. 360/77.08, 360/75, 78.07, 77.04; 700/28.7; 318/561
See application file for complete search history.

(56) References Cited

U.S. PATENT DOCUMENTS

| | | | | |
|---|---|---|---|---|
| 5,369,345 A | * | 11/1994 | Phan et al. ................. | 318/561 |
| 5,949,605 A | * | 9/1999 | Lee et al. ................. | 360/77.04 |
| 6,236,895 B1 | * | 5/2001 | Romano et al. .............. | 700/28 |
| 6,347,018 B1 | * | 2/2002 | Kadlec et al. ........... | 360/77.08 |
| 6,650,499 B1 | * | 11/2003 | Kusumoto ............... | 360/77.04 |

FOREIGN PATENT DOCUMENTS

| | | |
|---|---|---|
| JP | 07-098948 | 4/1995 |
| JP | 10-124111 | 5/1998 |
| JP | 2000-113613 | 4/2000 |
| JP | 2000-123502 | 4/2000 |
| WO | WO01/08138 | 1/2001 |
| WO | WO01/08154 | 1/2001 |

* cited by examiner

*Primary Examiner*—K. Wong
(74) *Attorney, Agent, or Firm*—Robert B. Martin; Dillon & Yudell LLP

(57) ABSTRACT

A technique for adaptively and stably updating the feed forward value required to drive the head of a rotational recording apparatus. A trajectory of a target position is generated for each seek command by using a compound function comprising a ramp function and a sine-wave function. The sine-wave element of the target position is transmitted to an adaptive filter for updating coefficients of the compound formula. All elements other than the sine-wave element are removed to provide a smooth update of the compound function's coefficients.

18 Claims, 7 Drawing Sheets

ROTATIONAL RECORDING APPARATUS AND CONTROL METHOD

This application claims the priority of Japanese Patent No. JP2001-290030 (IBM Docket No. JP920010156JP1), filed on Sep. 21, 2001, and entitled "Rotational Recording Apparatus And Control Method".

BACKGROUND OF THE INVENTION

1. Technical Field

The present invention relates to a rotational recording apparatus, such as a hard disk drive (hereinafter referred to as an HDD), and a control method therefor, and in particular to a technique for applying an adaptive algorithm for the feed forward control wherein driving in a sine wave is employed for a head seek.

2. Description of the Related Art

For a rotational recording apparatus, especially for an HDD, a VCM (Voice Coil Motor) is employed to drive a head that is used to read or write data. An arm is moved in the radial direction of a disk upon receiving a VCM drive current, and as a result, the head provided at the distal end of the arm is moved in accordance with the direction and the value of a drive current. The drive current is generated by the feedback control or by the feedback and feed forward control, and the head is positioned above a predetermined track.

In order to quickly move the head to a target track, generally the head positioning is performed by combining multiple control modes. That is, when the seek distance for a target track is sufficiently long, the velocity control mode in which the head velocity is used as a state value is employed. When the distance for the target track is shortened, the mode is changed to the position control mode in which the head position is used as a state value. The position control mode is separated into a settling mode for moving the head to the range of the target track, and a track following mode for maintaining the head at a centered position along the target track.

When these control modes are changed, especially when the velocity control mode is changed to the position control mode, the drive current may be discontinuously changed, depending on the state. The drive current may also be discontinuously changed in the initial head driving stage. A discontinuous change of the drive current may cause the VCM to produce acoustic noise.

Therefore, in order to reduce acoustic noise, techniques have been devised for shaping drive currents to obtain sine waves. For example, in Japanese Unexamined Patent Publication No. 2000-123502 a technique is disclosed for moving a transducer (head) in accordance with a sine-wave acceleration trajectory during the execution of a seek routine (velocity control mode). Using this technique, the high frequency element of a drive current is reduced by obtaining the sine-wave acceleration trajectory, and acoustic noise can be minimized.

When the VCM drive current is to be shaped to obtain a sine wave, a difference between a target position and the current head position is detected, and in accordance with a feedback control wherein negative feedback is performed for a drive current to reduce the difference to zero, the head does not always follow an intended trajectory. FIG. 7 is a graph showing a target position and an actual head position attained by the feedback control discussed by the present inventor. The vertical axis represents a track (position), and the horizontal axis represents a sample. The sample indicates an arbitrary sampling time, and is converted into the time level by multiplying the sampling time (sampling cycle) T. A broken line indicates the trajectory of the target position, and a solid line indicates the trajectory of the actual head position. The approach of the trajectory of the head position to that of the one for the target position is delayed, and overshoots the target track (one track). As a result, the period of time required to reach the target track is extended. This is because there is a phase delay included in the transfer function of the feedback loop, and it is apparent that a quick movement of the head is difficult when only feedback control is employed. A countermeasure for increasing the gain of the feedback loop may be employed; however, since the drive current can not be calculated as the difference between the target position and the current position is reduced, matching the target position becomes increasingly difficult, and the probability of an overshoot is increased.

Therefore, a countermeasure involving the combining of the feed forward control processes may be employed. However, to carry out the feed forward control, what will be the system response to the input of data must be understood, i.e., a drive current that is to be input and how this current will move the head must be understood, and this Is requires system modeling. System modeling, however, is not easy, because when apparatuses are mass produced, manufacturing variances may cause affected units to function slightly differently, making it difficult to obtain in advance a model that will be appropriate for all such products. Further, even when actual measurements are employed to provide a useful model for a specific apparatus, it is substantially impossible to obtain models for all possible product variations using measurements.

Therefore, an algorithm for adaptively updating a system parameter, such as an adaptive algorithm, can be applied for a feed forward system. However, the stability of the system using the adaptive algorithm is not guaranteed unless the system has been devised.

Thus there is a need for a technique for adaptively and stably updating the feed forward value required to drive the head of a rotational recording apparatus along a sine-wave trajectory. According to such a technique, the moving head trajectory can match the target trajectory, and the drive current can be shaped so that, for the reduction of acoustic noise, it more nearly corresponds to the sine wave.

SUMMARY OF THE INVENTION

The overview of the present invention is as follows. According to the present invention, a rotational recording apparatus includes: a head for reading data from a rotatable recording medium; head driving means for driving the head; head position detection means for outputting data for the current position of the head on the recording medium; control means for acquiring a difference between the current position data and a target position, and for generating a feedback control signal to be transmitted to the head driving means; adaptive filters for outputting the feed forward control signal to the head driving means, and for adaptively changing coefficients of the adaptive filters; adaptive algorithm means for calculating the coefficients of the adaptive filters; and a filter for removing elements other than sine-wave elements that are included for the difference and the target position, and for generating data to be input to the adaptive algorithm means, wherein a target head position trajectory, extended upon the reception of a seek command from a current head position to a seek position designated by a seek command, is defined as a trajectory generated by a compound function of a ramp function and a sine-wave function.

According to the rotational recording apparatus, since the adaptive algorithm is applied for the feed forward control system, optimal control can be exercised even when system modeling is incomplete. Further, since the elements other than the sine-wave element are removed from a signal input to the adaptive algorithm, the system can be stably operated.

More specifically, according to the present invention, a rotational recording apparatus includes: a head for reading data from a rotatable recording medium; head driving means for driving the head; head position detection means for outputting data for the current position of the head on the recording medium; control means for acquiring a difference between the current position data and a target position, and for generating a feedback control signal to be transmitted to the head driving means; means for calculating a seek distance by using a target track included in a seek command; means for referring to the seek distance, and for calculating or obtaining either a seek time or the number of samples required for a seek; means for employing either the seek distance and the seek time or the number of samples to calculate the target position for each sample; means for calculating a first value by performing, for the sine-wave element of the target position, a compensatory operation that corresponds to the gain and the phase of a feedback loop; means for calculating a second value by removing elements, other than the sine-wave element, from a difference between the current head position and the target position; means for calculating the coefficient of an adaptive filter by using the first value and the second value; and means for calculating a control output by using the output of a feedback controller, which receives the difference, and the output of the adaptive filter, which receives the sine-wave element of the target position.

The rotational recording apparatus further includes: a storage area for storing the coefficient of the adaptive filter; and means for, upon the reception of the seek command, obtaining the coefficient from the storage area and defining the coefficient as the initial value of the adaptive filter. That is, in some cases, the coefficient that seems optimal has already been stored by the preceding seek operation. In this case, the previously obtained coefficient is employed as the initial value of the adaptive filter. The recording area is provided for every seek distance or for every predetermined range including the seek distance, and the coefficient stored in the area corresponding to the seek distance may be obtained.

An adaptive filter of least-mean-squares method (LMS) type may be used as the adaptive filter. Further, the present invention can also be understood as being the method implemented by the above described apparatus.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
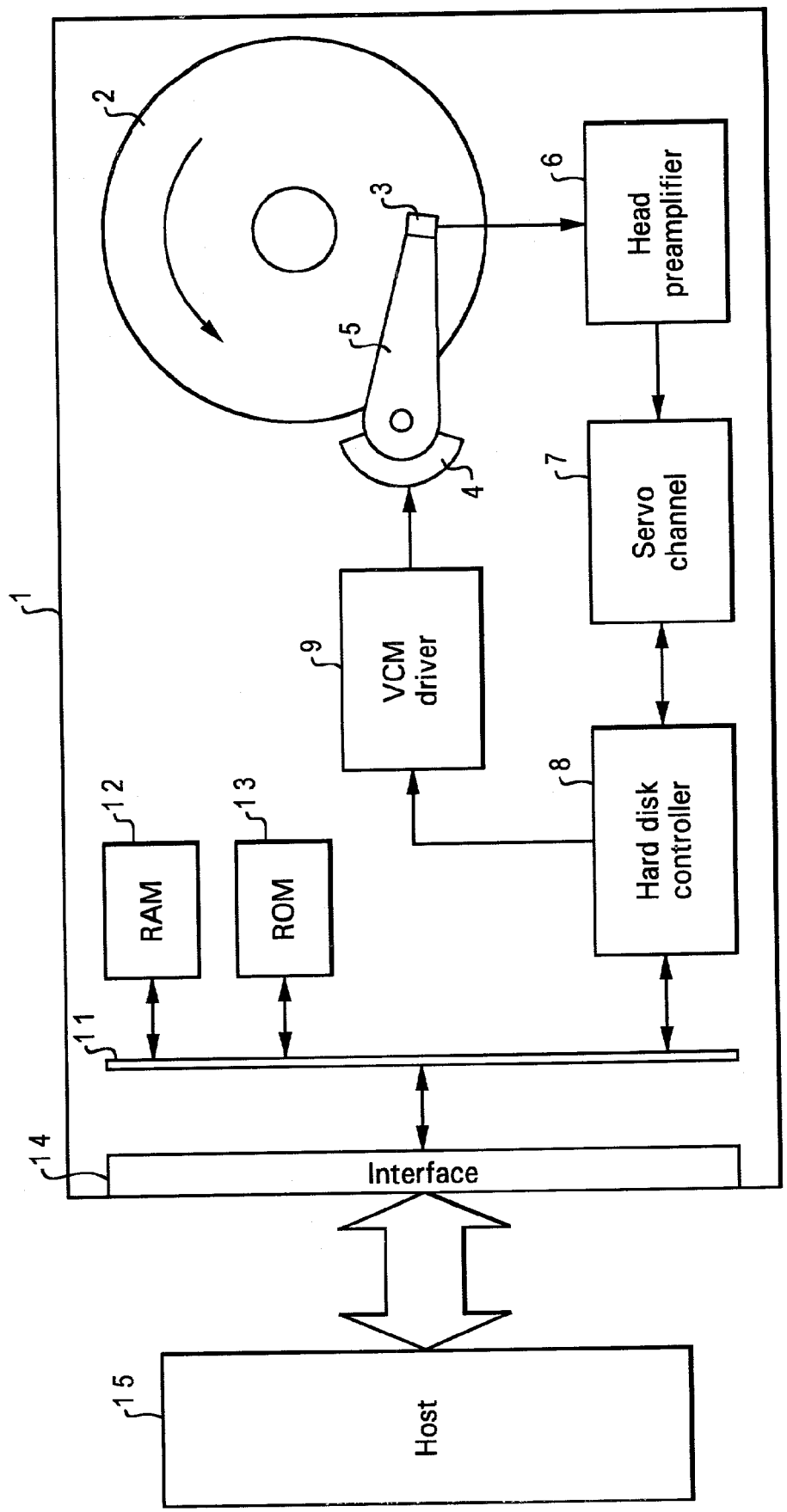
FIG. 1 is a block diagram showing an example hard disk drive according to one embodiment of the present invention.

The preferred embodiment of the present invention will now be described in detail while referring to the accompanying drawings. It should be noted, however, that the present invention can be implemented for various other modes and should not be limited to this embodiment. The same reference numerals are employed throughout the embodiment to denote corresponding or identical components.

FIG. 1 is a block diagram showing an example hard disk drive according to one embodiment of the present invention. A hard disk drive 1 includes: a magnetic recording medium 2, a head 3, a voice coil motor (VCM) 4, an arm 5, a head preamplifier 6, a servo channel 7, a hard disk controller 8, a VCM driver 9, a bus 11, a RAM (Random Access Memory) 12, a ROM (Read Only Memory) 13 and an interface 14.

The magnetic recording medium 2 is a recording disk medium, rotated by a spindle motor, for example, on which information is magnetically recorded, and on which position data is radially recorded in advance. The head 3 has a function for recording data magnetically or for reading magnetically recorded data, and employs, for example, great magnetic resistance (GMR) effects to convert magnetic data into an electric signal. The VCM 4 drives the arm 5 in response to a current, and moves the head 3 provided at the distal end of the arm 5 in the radial direction of the recording medium 2. Together, the VCM 4 and the arm 5 constitute an actuator. The head preamplifier 6 amplifies an analog signal received from the head 3 and transmits the amplified signal to the servo channel 7. It should be noted that the analog signal is amplified to a constant level under auto gain control. The hard disk controller 8, which controls the entire disk drive, receives, for example, a servo signal from the servo channel 7 and outputs a head control signal to the VCM driver 9. The VCM driver 9 receives a head control signal from the hard disk controller 8, and generates a drive current to drive the VCM 4. It should be noted that in general, the maximum drive current is limited due to the capacity of a power source.

The hard disk controller 8 is connected to the RAM 12, the ROM 13 and the interface 14 by the bus 11. The interface 14 interfaces a host 15. A program to be processed by the micro-processing unit (MPU) of the hard disk controller 8 is stored in the ROM 13, and is loaded from the ROM 13 to the RAM 12. The RAM 12 also functions as a buffer for the input/output of data for the host 15. In this embodiment, the RAM 12 and the ROM 13 are connected to the same bus as the interface 14; however, a faster bus than the bus 11 may be provided, and the RAM 12 and the ROM 13 may be connected to this fast bus.

Figure 2:
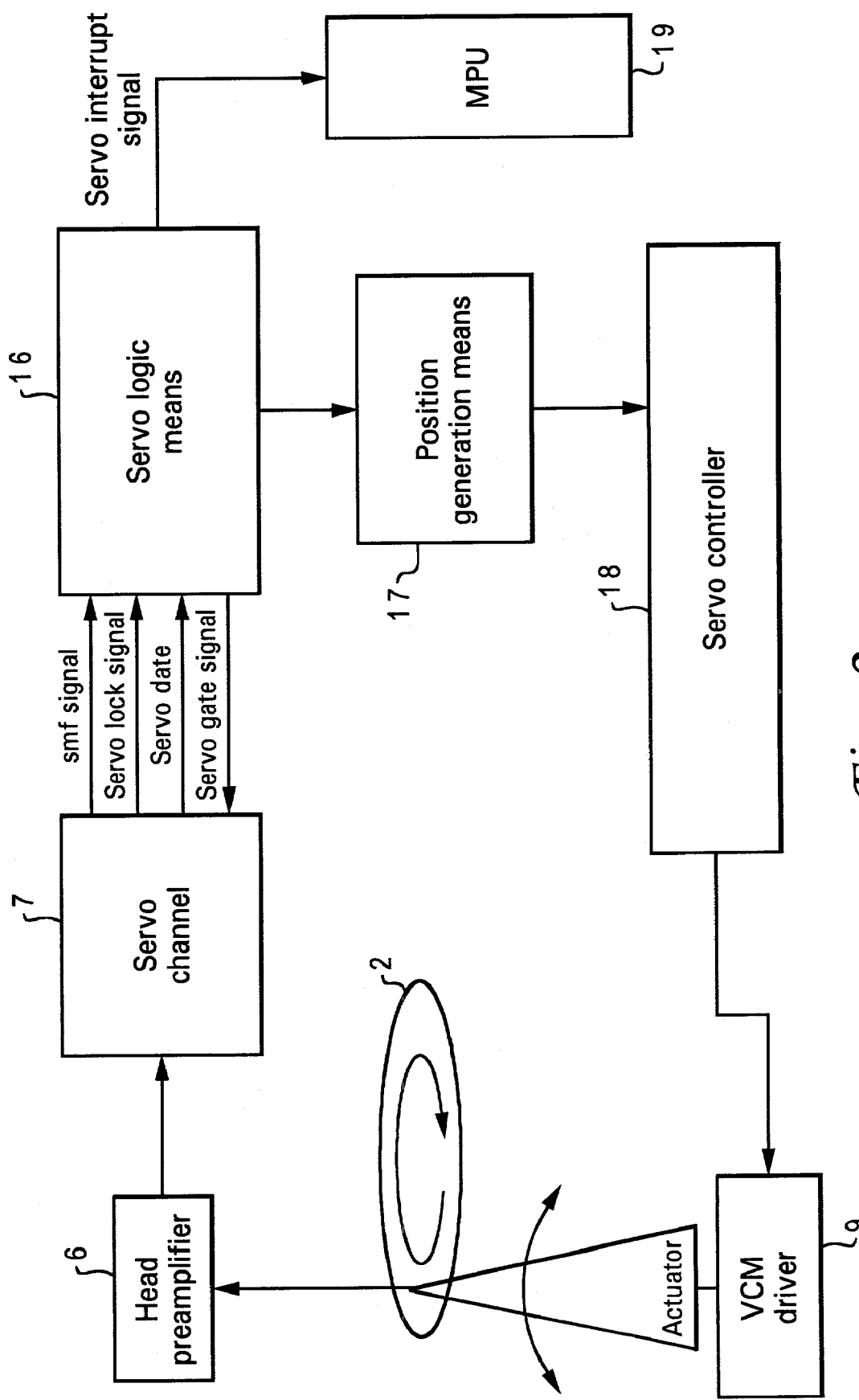
FIG. 2 is a more detailed block diagram showing a hard disk controller and its peripheral members.

FIG. 2 is a more detailed block diagram showing the hard disk controller 8 and the peripheral members. In addition to the above described members or means, the following members and means are provided. That is, the hard disk drive 1 further comprises servo logic means 16, position generation means 17, a servo controller 18 and an MPU 19. Many members or means are provided as a one-chip device for the hard disk controller 8; however, they may also be formed as discreet elements.

As is described above, position data is radially recorded on the magnetic recording medium 2. The position data includes a servo address mark (SAM), a Gray code and a burst signal. The data on the recording medium 2, including the position data, is read by the head 3 and is amplified by the head preamplifier 6, and the resultant signal is transmitted to the servo channel 7. The SAM is used for the detection of the current track position of the head 3, and the Gray code is used for the detection of the displacement of the head 3 relative to the track center.

The servo channel 7 detects the SAM from the analog waveform of the head preamplifier 6, and upon the detection of the SAM, transmits an smf (servo address mark found) signal to the servo logic means 16. Further, the servo channel 7 decodes the Gray code following the SAM, and performs an A/D conversion for the burst signal. These data are then serially transferred via a servo data line to the servo logic means 16. The servo channel 7 is itself rendered active by a servo gate signal.

The servo logic means 16 controls the timing for rendering the servo channel 7 active in order to read a servo pattern (position data) that is written to the recording medium 2 at a designed sampling interval (control cycle). The data obtained from the servo channel 7 is transferred to the position generation means 17. Further, at the timing whereat the position data is obtained, the servo logic means 16 generates a servo interrupt for the MPU 19, and at the same time, generates the status of a servo lock. The servo logic means 16 may include a function for monitoring the state of the detection of the SAM by the servo channel 7, and for generating a dummy SAM when the SAM is not detected within a predetermined time window.

The position generation means 17 generates the current position based on the servo pattern, and employs the obtained current position and the target position to calculate position deviation data that is required for the control process. The position data and the deviation may be generated by the servo logic means 16.

The servo controller 18 employs the deviation between the current head position and the target position to generate a control signal to be transmitted to the VCM driver 9. As will be described later, the control signal is constituted by a feedback control signal and a feed forward control signal. The servo controller 18 incorporates a system, a filter model and a parameter that are required for the generation of a control signal.

At the preceding stage of the servo controller 18, input optimization means may be provided that has a function for examining data output by the position generation means 17 and for preventing the servo controller 18 from discontinuously outputting data. Furthermore, a digital filter, such as a notch filter for restricting the resonance of a mechanism, may be provided at the succeeding stage of the servo controller 18. The position generation means 17 may be implemented as the servo controller 18.

The MPU 19 executes various controls in accordance with micro code recorded in the RAM 12 or the ROM 13. The MPU 19 has a control function, especially important to the embodiment, for providing servo control in accordance with an interrupt signal transmitted by the servo logic means 16.

Figure 3:
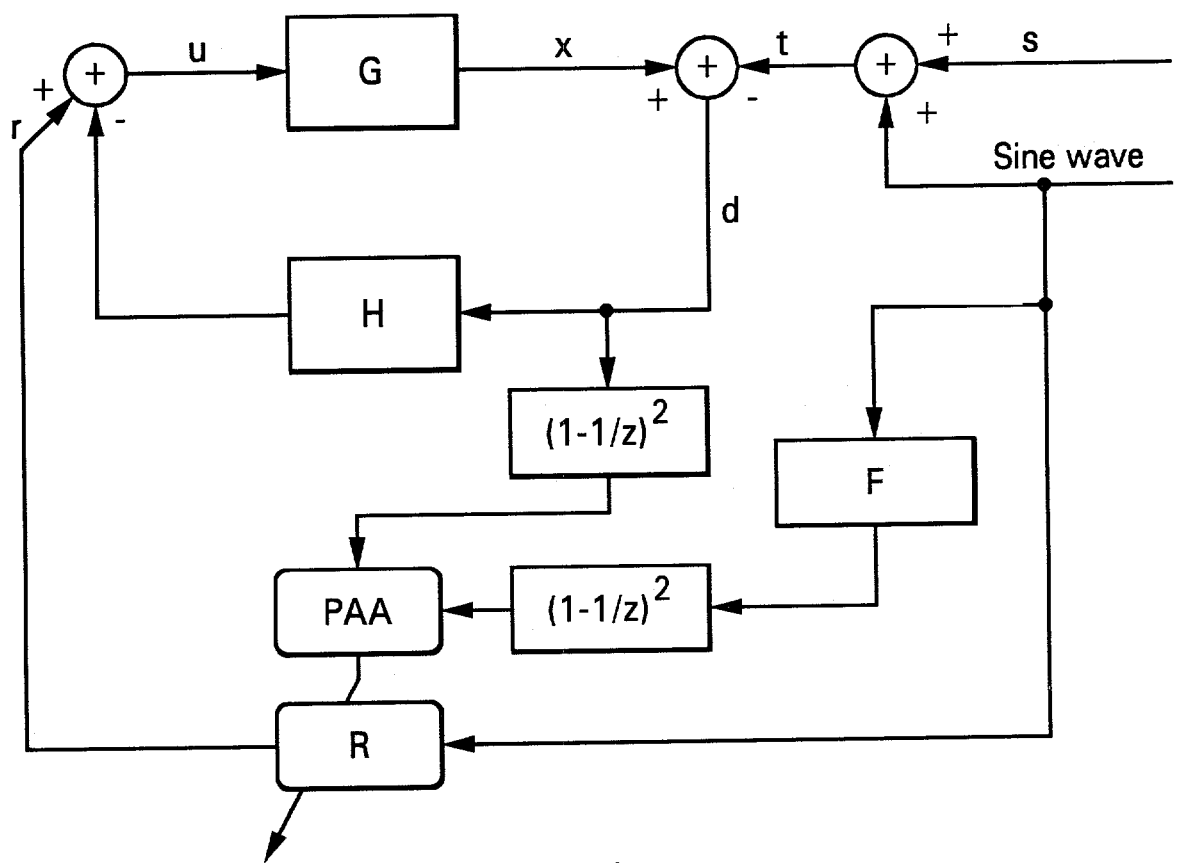
FIG. 3 is a block diagram showing an example model of a control system according to the embodiment.

FIG. 3 is a block diagram showing a model of a control system according to the embodiment. A VCM transfer function G is the model for the process from the input of the VCM driver 9 until the detection of a head position (the current head position x), and a controller transfer function H is the model for the process until the generation of a feedback control signal via a controller by using the current head position x.

When J denotes inertia, K denotes a torque constant, P denotes a track pitch, L denotes the distance from the head 3 to the rotation center of the actuator, T denotes a sampling time, and qT denotes a period of time extending from the reading of the position data by the head 3 to the setting of the VCM drive current to a DAC (D/A converter). The discrete equation of motion wherein the VCM system is driven at a constant current is represented by equation 1. In the following explanation, the time element is represented by sample n, and the time from $n=n_0$ to $n=n_1$ is $(n_1-n_0)T$.

Equation 1

$$X_p(n+1)=AX_p(n)+Bu(n)$$

wherein $X_p(n)$ is represented by equation 2.

$$X_p(n) = \begin{vmatrix} x(n) \\ v(n) \\ u(n-1) \end{vmatrix} \quad \text{[Equation 2]}$$

wherein x(n) denotes the head position (track) at the time n, u(n) denotes the head velocity (track/sampling time) at the time n, and u(n) denotes a VCM current (A) at the time n. Furthermore, A and B are represented by equations 3 and 4.

$$A = \begin{bmatrix} 1 & 1 & q\left(1-\frac{1}{2}q\right)T^2C/\theta_t \\ 0 & 1 & qT^2C/\theta_t \\ 0 & 0 & 0 \end{bmatrix} \quad \text{[Equation 3]}$$

$$B = \begin{bmatrix} \frac{1}{2}(1-q)^2 T^2 C/\theta_t \\ (1-q)T^2C/\theta_t \\ 1 \end{bmatrix} \quad \text{[Equation 4]}$$

wherein $C=K_t/J$ and $q_t=P/L$.

For a typical HDD, specific values are K=0.002 Nm/A, J=0.1×10$^{-4}$ Kgm$^2$, P=1.337×10$^{-6}$ m, L=0.0161 m, T=2.38095×10$^{-4}$ s and q=0.13.

Suppose that the controller that can stably control this VCM system is represented by equation 5.

Equation 5

$$X_c(n+1)=A_cX_c(n)+B_c(x(n)-t(n))$$

$$u(n)=-(C_cX_c(n)+D_cx(n))$$

wherein t(n) denotes a position target at the time n, and $X_c(n)$ denotes a state variable for the controller. The first term of the state variable corresponds to an integrator, the second term corresponds to the position at n−1, the third term corresponds to a VCM current at n−1 and the fourth term corresponds to a VCM current at n−2.

When the parameters having the above described specific values are employed for equation 5, $A_c$, $B_c$, $C_c$ and $D_c$ are represented by equations 6 to 9.

$$A_c = \begin{bmatrix} 1 & 0 & 0 & 0 \\ 0 & 0 & 0 & 0 \\ 0.000129 & -0.00380 & -0.0907 & 0.0408 \\ 0 & 0 & 1 & 0 \end{bmatrix} \quad \text{[Equation 6]}$$

$$B_c = \begin{bmatrix} 1 \\ 1 \\ 0.00482 \\ 0 \end{bmatrix} \quad \text{[Equation 7]}$$

Equation 8

$C_c = [0.000129 \ -00380 \ -0.0907 \ 0.0408]$

Equation 9

$D_c = [0.00482]$

Assume that a trajectory shown in equation 10 is provided, as target position t(n) at the time n, for the feedback system including the VCM system (transfer function G) and the controller (transfer function H).

$$\begin{aligned} s(0) &= 0 \\ s(n+1) &= s(n) + 1 \\ v(n) &= -\frac{W}{2\pi} \sin\left(\frac{2\pi}{M} n\right) \\ t(n) &= \frac{W}{M} s(n) + v(n) \end{aligned} \quad \text{[Equation 10]}$$

W denotes a seek distance, and M denotes the number of samples taken at the seek distance W. When the sampling time T is employed, the seek time is defined as MT. The first term (W/M×s(n)) of the target position t(n) corresponds to a ramp element, and the second term (u(n)) corresponds to a sine-wave element. When the seek distance W is defined as one track and the number of samples M is defined as 10, t(n) is indicated by a broken line in FIG. 7. In this embodiment, a function s(n) that increases or decreases linearly relative to n (in proportion to n) is employed as the ramp function. However, the ramp function may be a monotone increasing function or a monotone decreasing function that substantially acts as the ramp function (e.g., $n^2$, $\log(\alpha n)$, $1-e^\alpha$, etc.), or a polynomial function wherefor the difference between the relative maximum point and the relative minimum point is sufficiently smaller than the amplitude (W/2p) at the second term. That is, an arbitrary function may be employed for the first term when the inflection of t(n) is provided mainly by the sine-wave function at the second term and when the travel from the seek start point to the end point is provided by the first term. So long as there is no substantial difference in sound control effects, an arbitrary function can be employed for the first term. In this specification, a function for generating a ramp-function trajectory is also included in the ramp function.

Figure 7:
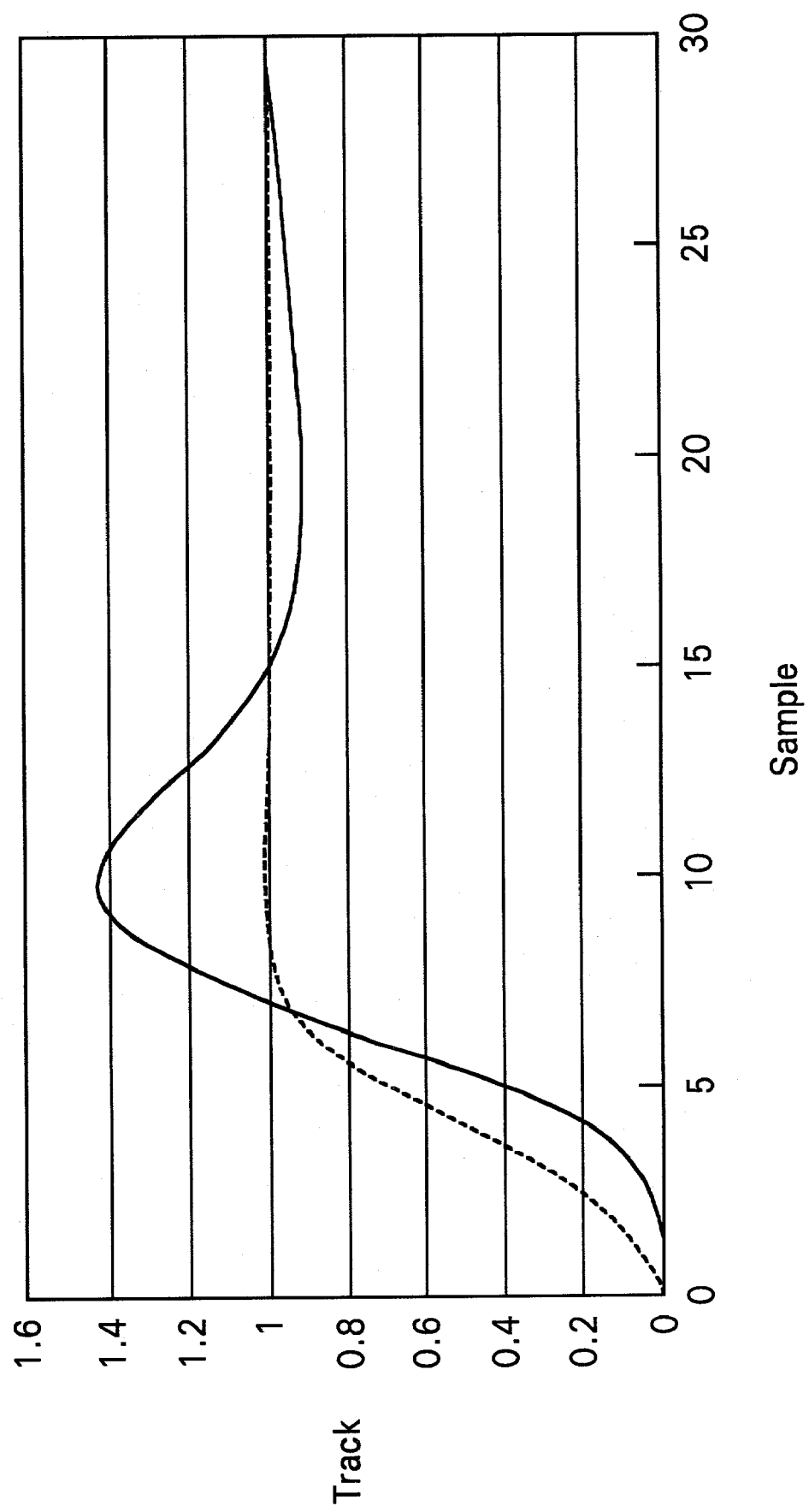
FIG. 7 is a graph showing the target position and the actual head position when the feedback control discussed by the present inventor is performed.

Even when the target position t(n) is provided, as is shown in FIG. 7, the head position trajectory is delayed only by the feedback loop.

Thus, the feed forward system is additionally provided. Since an appropriate parameter for the model is necessary, as is explained in the summary of the invention, an adaptive algorithm is employed that updates the parameter so as to exercise optimal control even when an appropriate parameter is unknown. That is, the feed forward system is constituted by an adaptive filter R. The parameter of the adaptive filter R is updated by the parameter adaptation algorithm (PAA).

When the input to the PAA is a sine-wave function, the system can be stably operated. However, in this embodiment, a difference d between the target position t and the current position x, which is to be transmitted to the parameter adaptation algorithm PAA, is not a sine wave. Therefore, the following means is added.

The input to the adaptive filter R is defined as a sine-wave function element for the target position t, and a signal is input to the parameter adaptation algorithm PAA via a filter $(1-1/z)^2$ that removes all elements other then the sine-wave function element. Since this filter $(1-1/z)^2$ is employed, the signal input to the parameter adaptation algorithm PAA consists only of the sine-wave element, and a stable operation is ensured. In this case, z denotes a complex variable in a Z conversion.

The filter F approximates the loop transfer function G/(1+GH) and is used to compensate for a phase difference between the input point of the PAA and the operating point.

Figure 4:
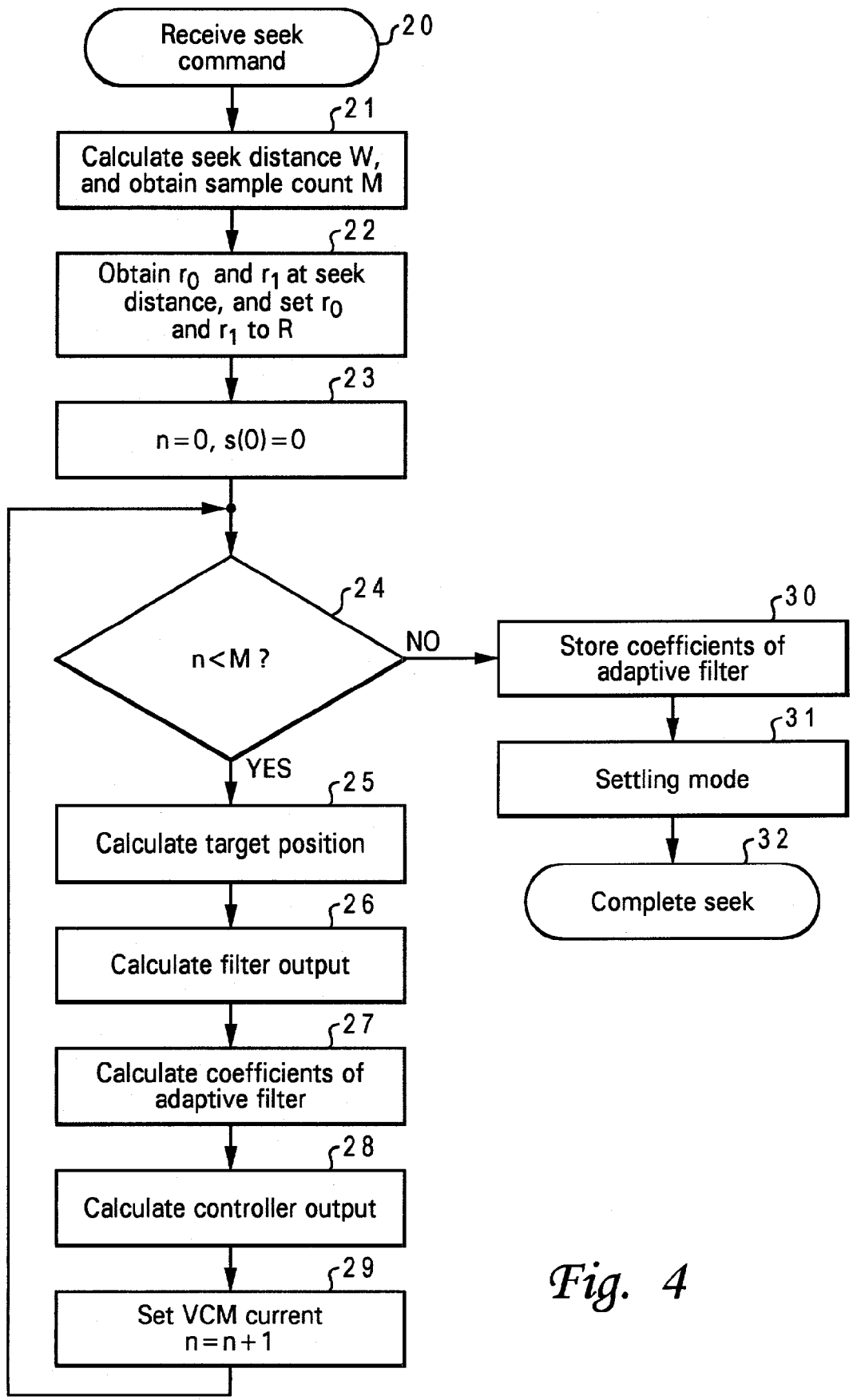
FIG. 4 is a flowchart showing an example control method according to the embodiment.

FIG. 4 is a flowchart showing an example control method according to the embodiment. The processing in FIG. 4 is initiated upon the reception of a seek command (step 20).

A difference between the seek position included in the seek command and the current head position is calculated to obtain the seek distance W. Further, the seek time (sample count M) is obtained from the seek distance W (step 21). The seek time, i.e., the sample count M required before the end of the seek is reached, can be recorded in advance as a table. In addition, the sample count M need not be recorded for all the seek distances W, and can, for example, be recorded for every ten tracks. It should be noted that the sample count M can also be obtained by performing a calculation each time a command is received.

The coefficients ($r_0$ and $r_1$) of the adaptive filter R are obtained and set (step 22). In this embodiment, since a secondary LMS (least-mean-squares method) filter is employed as an adaptive filter, the obtained coefficients are $r_0$ and $r_1$. It should be noted that the coefficients $r_0$ and $r_1$ are recorded in advance in a table and are obtained by being read from the table. As the coefficients $r_0$ and $r_1$, values obtained during a previous seek operation are recorded in the table and are used as the initial values for a new seek operation. Since the coefficients $r_0$ and $r_1$ can be recorded for each seek distance W, coefficients $r_0$ and $r_1$ pertinent to the seek distance W for the current seek time can be read. As well as the case for the sample count M, the coefficients $r_0$ and $r_1$ need not be recorded for each seek distance W, and may be held for each of the distances W within a specific range, such as every ten tracks.

For initialization, the counter variable n is set to 0, and the ramp function s(0) is set to 0 (step 23).

Then, a check is performed to determine whether n is smaller than M (step 24). When n is smaller than M, i.e., when the number of current samples is smaller than the number of samples for the current command, the target position t(n) at the time n is calculated (step 25). Equation 10 is employed for the calculation of t(n).

Then, the outputs of the filter F and the filter $(1-1/z)^2F$ are calculated (step 26). The filter F may actually be formed, and since the signal input to the filter $(1-1/z)^2F$ is a sine-wave function, the gain and the phase can be obtained by performing a calculation. When the gain is denoted by X and the phase is denoted by Y, $$X : / \left(1 - \frac{1}{z}\right)^2 F/\omega = \frac{2\pi}{M}$$ [Equation 11]

$$Y : \angle \left(1 - \frac{1}{z}\right)^2 F/\omega = \frac{2\pi}{M}$$

When this equation is employed for the sine-wave function element, based on equation 12, $$c_n = X\left(-\frac{W}{2\pi}\right)\sin\left(\frac{2\pi}{M}(n+1) + Y\right)$$ [Equation 12]

$$c_{n-1} = X\left(-\frac{W}{2\pi}\right)\sin\left(\frac{2\pi}{M}n + Y\right)$$

the output of the filter $(1-1/z)^2 F$ is obtained.

Thereafter, the coefficient of the adaptive filter is calculated (step 27). And when a difference between the current head position x(n) and the target position t(n) at the time n is defined as d(n), $$d(n)=x(n)-t(n).$$

When only sine-wave element f(n) is extracted from d(n), $$f(n)=d(n)-2d(n-1)+d(n-2).$$

Therefore, the coefficients $r_0$ and $r_1$ of the adaptive filter R are represented by equation 13.

Equation 13

$$r_0 = r_0 - 2\alpha f(n)c_n$$

$$r_0 = r_0 - 2\alpha f(n)c_{n-1}$$

wherein a=0.0001.

The output of the feedback system is then added to the output of the adaptive filter to obtain the controller output (step 28), as represented by equation 14.

Equation 14

$$X_c(n+1) = A_c X_c(n) + B_c(x(n) - t(n))$$

$$u(n) = -(C_c X_c(n) + D_c x(n)) + r_0 v(n+1) + r_1 v$$

The VCM current u(n) is set to the VCM to provide n=n+1, and program control returns to step 24 (step 29).

When the decision at step 24 is false, i.e., when the sample count M is reached for the current seek, the coefficients $r_0$ and $r_1$ of the adaptive filter R are stored in the table (step 30) and the seek mode enters the settling mode (step 31). When the settling mode has been completed and the mode is shifted to the track following mode, the seek is terminated (step 32).

Figure 5:
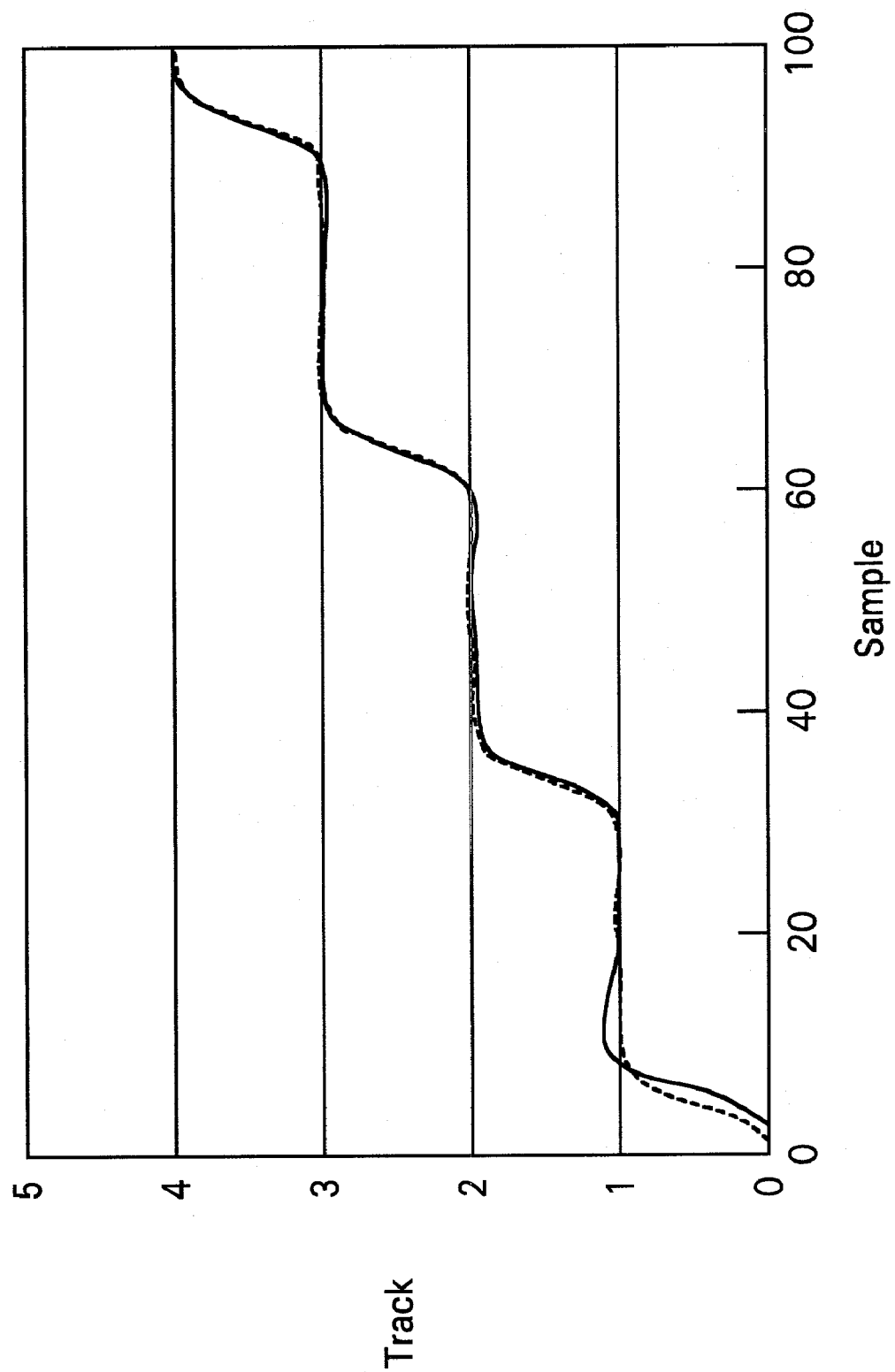
FIG. 5 is a graph showing a head position and a target position for an example step response when the control method of the invention is applied.

FIG. 5 is a graph showing the results obtained by repeating the operation wherein the seek is performed for one track, and thereafter the settling is executed using 20 samples for which the adaptive filter output r is zero and a constant value is used as a target. The vertical axis in FIG. 5 represents a track (position), and the horizontal axis represents a sample (time). The sample is the same as explained in FIG. 7. The broken line indicates a target position, and the solid line indicates the actual head position.

As is apparent from the graph, in each instance, as the sampling time elapses, the head position gradually approaches and matches the target value.

Figure 6:
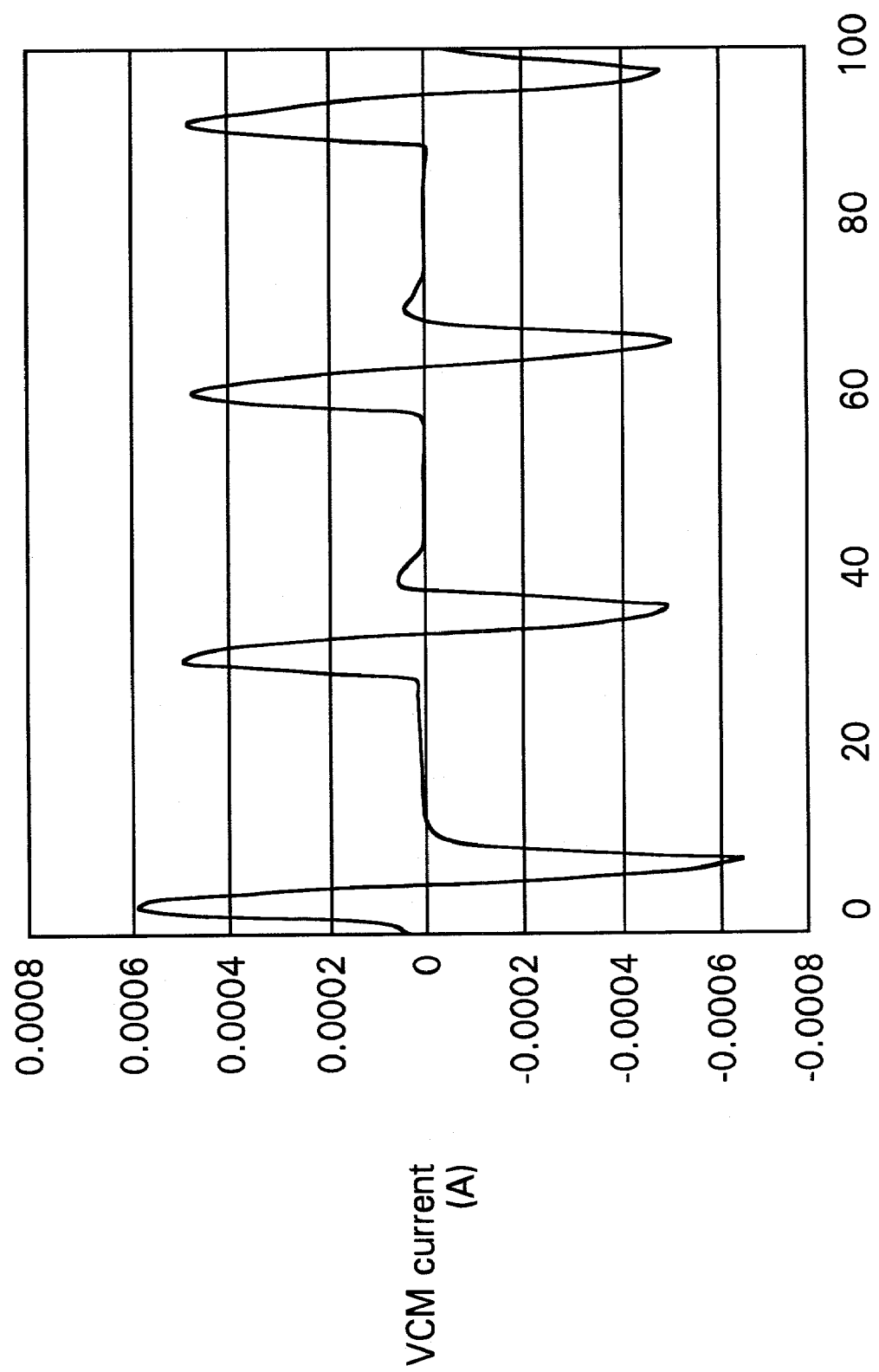
FIG. 6 is a graph showing an example VCM control current when the control method of the embodiment is applied.

FIG. 6 is a graph showing the VCM drive current supplied for the case shown in FIG. 5. The vertical axis represents the VCM current, and the horizontal axis represents the sample (time). As is apparent from the graph, the drive current is substantially shaped like a sine wave.

The present invention has been described by using the embodiment. However, the present invention is not limited to this embodiment, and various modifications are possible without departing from the scope of the invention.

For example, the order of the adaptive filter is not limited to the second order, and a higher-order filter can be employed.

Further, the adaptive filter is not limited to the LMS, and a filter that adaptively changes a parameter as it learns can also be employed.

In this embodiment, an HDD has mainly been employed for the present invention. However, the present invention can be applied for a recording apparatus having not only an HDD, but also another rotary recording medium, such as a CD (Compact Disk), a DVD (Digital Video Disk) or a magneto-optical disk.

The typical effects obtained by this invention are as follows. That is, a feed forward value, by which the head of a rotational recording apparatus is driven and which has a shape similar to that of a sine waveform, can be adaptively and stably updated. Therefore, the head travel trajectory can be altered to match a predetermined target trajectory, and since the drive current waveform closely resembles a sine waveform, acoustic noise can be reduced.

Although aspects of the present invention have been described with respect to a data storage system, executing operational code that directs the method of the present invention, it should be understood that the present invention alternatively is implemented as a program product for use with a data storage system or computer system. Programs defining the functions of the present invention can be delivered to a data storage system or computer system via a variety of signal-bearing media, which include, without limitation, non-writable storage media (e.g. CD-ROM), writable storage media (e.g. a floppy diskette, hard disk drive, read/write CD-ROM, optical media), and communication media, such as computer and telephone networks including Ethernet. It should be understood, therefore, that such signal-bearing media, when carrying or encoding computer readable instructions that direct the method functions of the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed:

1. A rotational recording apparatus comprising:
    a head for reading data from a rotatable recording medium;
    head driving means for driving said head;
    head position detection means for outputting data for a current position of said head on said recording medium;

control means for acquiring a difference between said current position data and a target position, and for generating a feedback control signal to be transmitted to said head driving means, wherein said target position is derived by adding a ramp element to a sine-wave element;

adaptive filters for outputting said feed forward control signal to said head driving means, and for adaptively changing coefficients of said adaptive filters;

adaptive algorithm means for calculating said coefficients of said adaptive filters; and a filter for removing elements other than sine-wave elements that are included for said difference and said target position, and for generating data to be input to said adaptive algorithm means, wherein a target head position trajectory, extended upon the reception of a seek command from a current head position to a seek position designated by a seek command, is defined as a trajectory generated by said target position.

2. The rotational recording apparatus according to claim 1, wherein said adaptive filter is a least-mean-squares (LMS) type filter.

3. The rotational recording apparatus of claim 1, wherein the ramp element is a monotone increasing function.

4. The rotational recording apparatus of claim 1, wherein the ramp element is a monotone decreasing function.

5. The rotational recording apparatus of claim 1, wherein the ramp element is logarithmic function.

6. The rotational recording apparatus of claim 1, wherein the ramp element is a ramp function that includes a function for generating a ramp-function trajectory.

7. The rotational recording apparatus of claim 1, wherein the data for the current position of said head is a servo address mark (SAM), and wherein the rotational recording apparatus further comprises:

SAM generation means for generating a dummy SAM if an actual real-time SAM is not detected within a predetermined time window.

8. The rotational recording apparatus of claim 1, wherein said coefficients for said adaptive filters are held for only multiple-track units having a specific range.

9. The rotational recording apparatus of claim 8, wherein the specific range is every ten tracks.

10. A rotational recording apparatus comprising:

a head for reading data from a rotatable recording medium;

head driving means for driving said head;

head position detection means for outputting data for a current position of said head on said recording medium;

control means for acquiring a difference between said current position data and a target position, wherein said target position is derived by adding a ramp element to a sine-wave element, and for generating a feedback control signal to be transmitted to said head driving means;

means for calculating a seek distance by using a target track included in said seek command;

means for referring to said seek distance to calculate a seek time required for a seek;

means for employing said seek time to calculate said target position for each sample;

means for calculating a first value by performing, for the sine-wave element of said target position, a compensatory operation that corresponds to the gain and the phase of a feedback loop;

means for calculating a second value by removing elements, other than said sine-wave element, from a difference between the current head position and said target position;

means for calculating the coefficient of an adaptive filter by using said first value and said second value; and means for calculating a control output by using the output of a feedback controller, which receives said difference, and the output of said adaptive filter, which receives the sine-wave element of said target position.

11. The rotational recording apparatus of claim 10, further comprising:

means for referring to said seek distance to calculate a number of samples required for said seek; and means for employing said number of samples to calculate said target position for each sample.

12. The rotational recording apparatus according to claim 10, further comprising:

a storage area for storing said coefficient of said adaptive filter; and means for, upon the reception of said seek command, obtaining said coefficient from said storage area and defining said coefficient as an initial value of said adaptive filter.

13. The rotational recording apparatus according to claim 10, wherein said adaptive filter is a least-mean-squares (LMS) type filter.

14. A method for controlling a rotational recording apparatus, said rotational recording apparatus including a head for reading data from a rotating recording medium, head driving means for driving said head, head position detection means for outputting data for a current position of said head on said recording medium, and control means for acquiring a difference between said current position data and a target position and for generating a feedback control signal to be transmitted to said head driving means, said method comprising the steps of:

calculating a seek distance using a target track included in a seek command to calculate a seek time required for a seek;

employing said seek time to calculate said target position;

calculating a first value by performing, for a sine-wave element of said target position, a compensatory operation that corresponds to a gain and a phase of a feedback loop, wherein said target position is derived by adding a ramp element to a sine-wave element;

calculating a second value by removing elements, other than said sine-wave element, from a difference between a current head position and said target position;

calculating a coefficient of an adaptive filter by using said first value and said second value;

calculating an output of a feedback controller using said difference between said current head position and said target position;

calculating an output of said adaptive filter using the sine-wave element of said target position; and calculating a control output using said outputs of said feedback controller and said adaptive filter.

15. The method of claim 14, further comprising:

calculating said seek distance to calculate a number of samples required for said seek; and employing said number of samples to calculate said target position for each sample.

16. The method according to claim 14, further comprising the steps of:
  upon a termination of said sampling using said seek command, storing said coefficient of said adaptive filter in a storage area; and
  upon the reception of a following seek command, obtaining said coefficient from said storage area and defining said coefficient as the initial value of said adaptive filter.

17. The method according to claim 16, wherein said coefficients of said adaptive filter are stored in correlation with a predetermined range for said seek distance.

18. The method according to claim 14, wherein an adaptive filter of least-mean-squares (LMS) type is used as said adaptive filter.

* * * * *

UNITED STATES PATENT AND TRADEMARK OFFICE
CERTIFICATE OF CORRECTION

| | |
|---|---|
| PATENT NO. | : 7,136,258 B2 |
| APPLICATION NO. | : 10/242220 |
| DATED | : November 14, 2006 |
| INVENTOR(S) | : Masashi Kisaka |

It is certified that error appears in the above-identified patent and that said Letters Patent is hereby corrected as shown below:

Column 3, line 23, delete "Is".

Column 9, line 31, delete "$r_1v$" and insert --$r_1v(n)$--.

Signed and Sealed this

Sixth Day of March, 2007

JON W. DUDAS
*Director of the United States Patent and Trademark Office*